US011231098B2

(12) United States Patent
Swinger

(10) Patent No.: US 11,231,098 B2
(45) Date of Patent: Jan. 25, 2022

(54) DIFFERENTIAL DISCONNECT ASSEMBLY

(71) Applicant: LINAMAR CORPORATION, Guelph (CA)

(72) Inventor: Evan Swinger, Farmington Hills, MI (US)

(73) Assignee: Linamar Corporation, Guelph (CA)

( * ) Notice: Subject to any disclaimer, the term of this patent is extended or adjusted under 35 U.S.C. 154(b) by 0 days.

(21) Appl. No.: 17/048,112

(22) PCT Filed: Apr. 16, 2019

(86) PCT No.: PCT/US2019/027670
§ 371 (c)(1),
(2) Date: Oct. 16, 2020

(87) PCT Pub. No.: WO2019/204300
PCT Pub. Date: Oct. 24, 2019

(65) Prior Publication Data
US 2021/0172506 A1 Jun. 10, 2021

Related U.S. Application Data

(60) Provisional application No. 62/658,229, filed on Apr. 16, 2018.

(51) Int. Cl.
*F16H 48/38* (2012.01)
*F16H 48/40* (2012.01)
(Continued)

(52) U.S. Cl.
CPC ............ *F16H 48/38* (2013.01); *F16H 48/08* (2013.01); *F16D 11/14* (2013.01)

(58) Field of Classification Search
CPC .......... F16H 48/38; F16H 48/08; F16H 48/40; F16H 2048/085
See application file for complete search history.

(56) References Cited

U.S. PATENT DOCUMENTS 1,459,894 A * 6/1923 Irwin ...................... F16H 3/145
475/160
1,955,103 A * 4/1934 Snow ...................... F16H 48/30
475/237
(Continued)

FOREIGN PATENT DOCUMENTS

DE          4429566 A1 * 2/1996 ............. B60K 23/08
DE 102016209738 12/2016
(Continued)

*Primary Examiner* — Sherry L Estremsky
(74) *Attorney, Agent, or Firm* — Miller Canfield

(57) ABSTRACT

An improved differential for a vehicle is provided which includes a disconnect assembly engaged between a ring gear and pinion gears and/or a gear nest associated with the pinion gears, wherein the disconnect assembly is able to disconnect torsional loading of torque between the ring gear and the pinon gears of the differential. The disconnect assembly selectively connects and disconnects the ring gear and pinon gears by preferably disconnecting from the gear nest disposed therebetween. Disconnection of the ring gear and pinion gears allows the ring gear, differential housing, bearings, and rest of the gear box to stop spinning while the wheels of the vehicle are spinning. The differential pinion gears are mechanically connected to the gear nest such that torque can be transferred from the differential gear nest to the differential pinion gears and then to the differential side gears. A spline ring is supported inside the differential housing and defines a mechanical connection which locks the ring gear and the gear nest to transfer torque therebetween, wherein the mechanical connection may be disconnected to unlock the ring gear and gear nest and disconnect such torsional loading to permit rotation of the side gears and pinion gears independent of the ring gear.

14 Claims, 4 Drawing Sheets

(51) Int. Cl.
*F16H 48/08* (2006.01)
*F16D 11/14* (2006.01)

(56) References Cited

U.S. PATENT DOCUMENTS

| | | | | |
|---|---|---|---|---|
| 4,788,888 A * | 12/1988 | Tsutsumikoshi | ....... | B60K 17/35 |
| | | | | 180/250 |
| 5,086,867 A * | 2/1992 | Hirota | .................. | B60K 17/351 |
| | | | | 180/233 |
| 5,385,513 A * | 1/1995 | Ishii | ....................... | B60K 17/08 |
| | | | | 475/198 |
| 5,890,989 A * | 4/1999 | Yamazaki | ................ | F16H 48/34 |
| | | | | 475/295 |
| 6,027,422 A * | 2/2000 | Yamazaki | .............. | B60K 23/04 |
| | | | | 192/53.36 |
| 6,450,915 B1 * | 9/2002 | Kazaoka | ................ | B60K 17/35 |
| | | | | 180/247 |
| 6,945,895 B2 * | 9/2005 | Fusegi | .................. | B60K 23/04 |
| | | | | 180/247 |
| 6,969,333 B2 * | 11/2005 | Sayama | ................... | B60K 6/26 |
| | | | | 475/5 |
| 9,649,931 B2 * | 5/2017 | Zhao | .................. | B60K 17/3462 |
| 10,415,680 B2 * | 9/2019 | Yoshisaka | ............ | F16H 48/08 |

FOREIGN PATENT DOCUMENTS

| | | | | |
|---|---|---|---|---|
| DE | 102013109835 | | 7/2017 | |
| DE | 102017107219 A1 * | | 10/2017 | ............ F16H 48/08 |
| WO | 20150165537 | | 11/2015 | |

* cited by examiner

DIFFERENTIAL DISCONNECT ASSEMBLY

CROSS REFERENCE TO RELATED APPLICATIONS

This application claims priority of U.S. Provisional patent Application No. 62/658,229, filed Apr. 16, 2018, the disclosure of which is incorporated herein by reference in its entirety.

BACKGROUND OF THE INVENTION

1. Field of the Invention

The present invention relates to a differential disconnect assembly for use in a driveline of a motor vehicle.

2. Description of Related Art

It is commonly known for vehicles to include locking differentials to prevent relative rotation of one driven wheel with respect to another driven wheel. This is usually accomplished by locking one differential side gear to a differential case or housing thereby preventing rotation of the side gear with respect to the case or housing. It is also known to provide a hydraulically or electrically actuated clutch for locking and unlocking the side gear of the differential assembly relative to the differential housing. An example of such a design is disclosed in DE 10 2013 109 835 B4, the disclosure of which is incorporated herein by reference in its entirety. However, such designs may be undesirable since it is necessary for the differential case or housing to be sufficiently robust to handle the torsional loading being transferred between a ring gear and side gears.

It is desirable to remove the loading on the differential housing, allowing the housing to be smaller while still handling the axial and radial loading requirements on the side gear or even allowing the differential housing to be eliminated.

SUMMARY OF THE INVENTION

The invention relates to an improved differential for a vehicle having a rotatable ring gear disposed in an outer housing which is stationary, wherein said ring gear engages with a drive shaft, motor, gear train or other drive components of the vehicle to effect rotation of the ring gear. The ring gear is rotatably supported, both axially and radially, by a set of bearings on the stationary housing, wherein the ring gear may preferably be supported by a differential housing and a differential cover, which are rotatably supported by the set of bearings grounded by the stationary housing. Optionally, the ring gear may be supported directly on the stationary housing by the bearings. In the preferred embodiment, the ring gear rotates with the differential housing and differential cover relative to the stationary housing in response to driven rotation of said drive shaft or other drive components. The ring gear selectively drives an interconnected a set of pinion gears.

The differential includes differential side gears, which are supported on the stationary housing preferably by the differential housing and differential cover and are selectively driven by rotation of said ring gear to provide differential driving of respective vehicle axles which in turn drive the vehicle wheels attached thereto. The side gears are in meshed engagement with the pinion gears, which are driven by said ring gear and thereby drive torque to any combination of output shafts, half shafts, link shafts, etc. connected between the wheels and side gears as is known in the art.

The inventive differential includes a disconnect assembly engaged between the ring gear and the pinion gears which is able to connect and disconnect the ring gear from the differential pinon gears of this vehicle differential. Preferably, the pinion gears engage with the ring gear through a differential gear nest, wherein the disconnect assembly selectively connects and disconnects the ring gear and pinon gears. Disconnection of the ring gear and pinion gears allows the ring gear, differential housing, bearings, and the rest of the gear box to stop spinning while the wheels of the vehicle are spinning.

In more detail, the differential pinion gears are mechanically connected to the differential gear nest such that torque can be transferred from the differential gear nest to the differential pinion gears and then to the differential side gears. The differential gear nest is supported radially and axially on the stationary housing by bearings, and preferably is supported, both radially and axially, by the differential housing and differential cover which are supported by the bearings, and the gear nest can spin freely relative to both the differential housing and cover. In the inventive differential, the disconnect assembly preferably includes a spline ring, which is radially piloted inside the differential housing and defines a mechanical connection which locks it rotationally to the ring gear. The spline ring in turn connects to the gear nest to transfer torque thereto independent of the differential housing, and may also disconnect from the gear nest to releasably disconnect the ring gear from the gear nest and pinion gears. While the spline ring is disposed radially between the ring gear and gear nest, the spline ring may alternatively be disposed axially between the ring gear and gear nest to perform the functions described herein. Further, the disconnect assembly could incorporate other structures in place of the spline ring such as a dog clutch or clutch plates which selectively connect and disconnect torque transfer between the ring gear and pinion gears.

An actuator is provided, and when activated, the actuator will move the spline ring axially and to engage or disengage a clutch between the spline ring and the differential gear nest so that said ring gear and gear nest rotate together when engaged allowing torque to travel from the ring gear through the spline ring to the differential gear nest. The gear nest in turn effects rotation of the pinion gears and side gears engaged therewith to transfer torque between the ring gear and the wheels.

When the actuator is deactivated in one embodiment, a return spring acts on the spline ring to move the spline ring axially to normally disengage the clutch between the spline ring and differential gear nest to thereby allow the differential gear nest to spin freely relative to the ring gear. As such, torsional loading is generated between the ring gear and pinion gears by engagement of the spline ring with the gear nest and pinion gears. With this inventive design, torsional loading through the differential housing is eliminated since the loading is provided through the three components, namely the three components of the ring gear, spline ring and gear nest/pinion gear assembly. This three piece differential design removes the torsional loading from the differential housing, allowing the differential housing to be smaller and/or made of different materials in comparison to prior art designs which transfer torque through a differential housing.

In the alternative, the spring may normally bias the spline ring to the connected or closed position so that the ring gear normally drives the gear nest during ring gear rotation and then the actuator is operated to axially displace the ring gear and disconnect the ring gear from the gear nest. When the actuator is deactivated, then the spline ring can slide axially back into engagement with and thereby reconnect the drive gear and gear nest.

In the above-described embodiment, the actuator essentially is mono-stable in that the spline ring is displaced from a first position to a second position when the actuator is actuated or active, but returns to the first position automatically when the actuator is deactivated. As such, the actuator needs to stay on for the spline ring to remain to the second position, wherein the spline ring preferably is engaged between the ring gear and gear nest to connect torque transfer.

In another embodiment, the actuator may be bi-stable wherein the actuator moves the spline ring between the first and second positions when activated, but the spline ring stays in the first or second position once the actuator is deactivated. This means there is no energy input required to keep the disconnect assembly engaged or disengaged. With the actuator of this second embodiment, the actuator is only energized or activated when it is necessary to move the spline ring between positions. In this second embodiment, the actuator preferably includes a cam ring which is movable relative to the spline ring, and the spline ring follows the contours of the cam ring to move axially during relative motion between the spline ring and cam ring. Once the spline ring is in the desired position to connect or disconnect the disconnect assembly, the actuator is turned off, wherein the spline ring will remain in that position indefinitely without any further energy input, until the actuator is again turned on or activated to move the spline ring to a new position. As such, the actuator is intermittently actuated to operate the disconnect assembly.

Other objects and purposes of the invention, and variations thereof, will be apparent upon reading the following specification and inspecting the accompanying drawings.

BRIEF DESCRIPTION OF THE DRAWINGS

Advantages of the present invention will be readily appreciated as the same becomes better understood by reference to the following detailed description when considered in connection with the accompanying drawings wherein.

Figure 1:
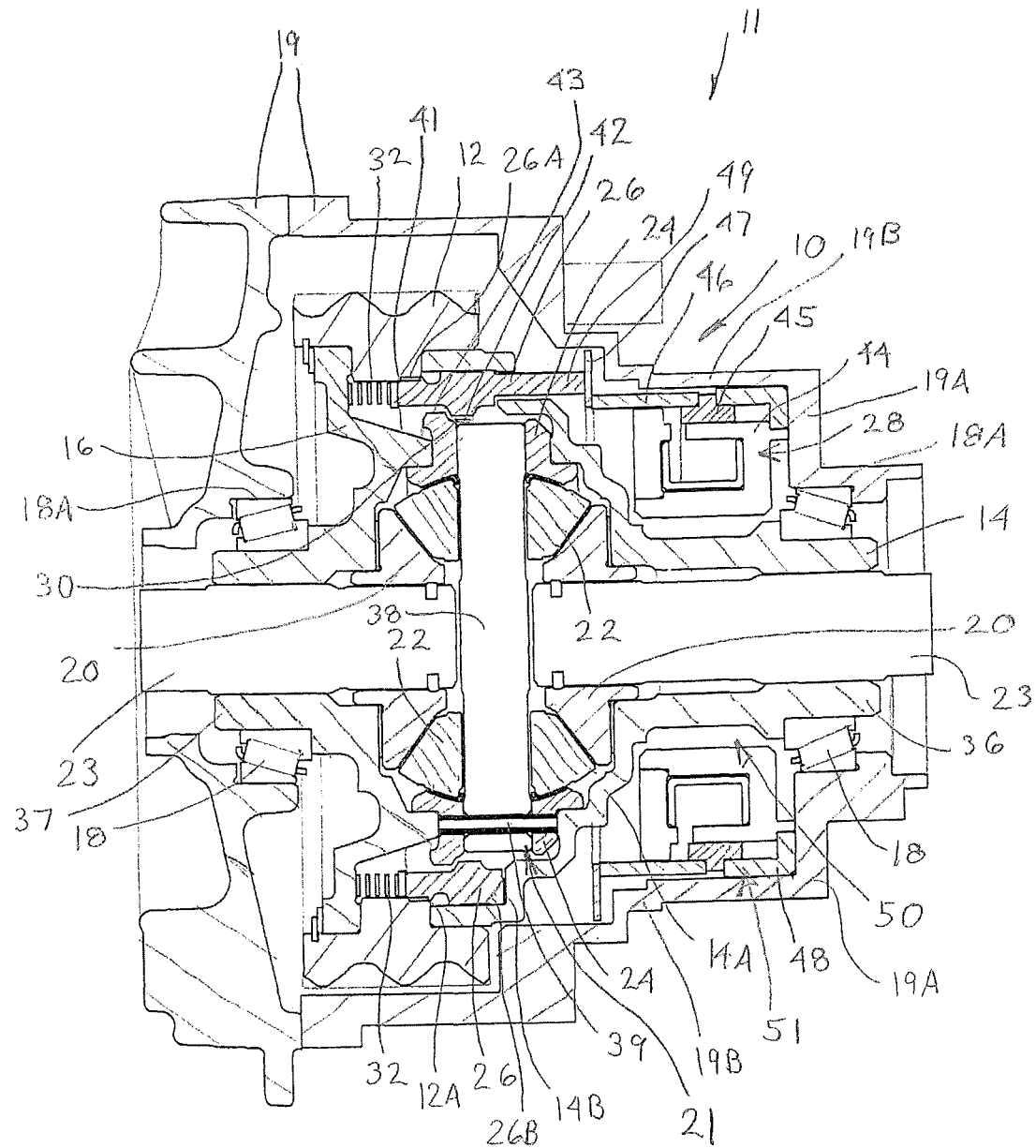
FIG. 1 is a cross-section side view of a differential disconnect assembly according to a first embodiment of the invention in an open condition.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION OF THE PREFERRED EMBODIMENT

Figure 2:
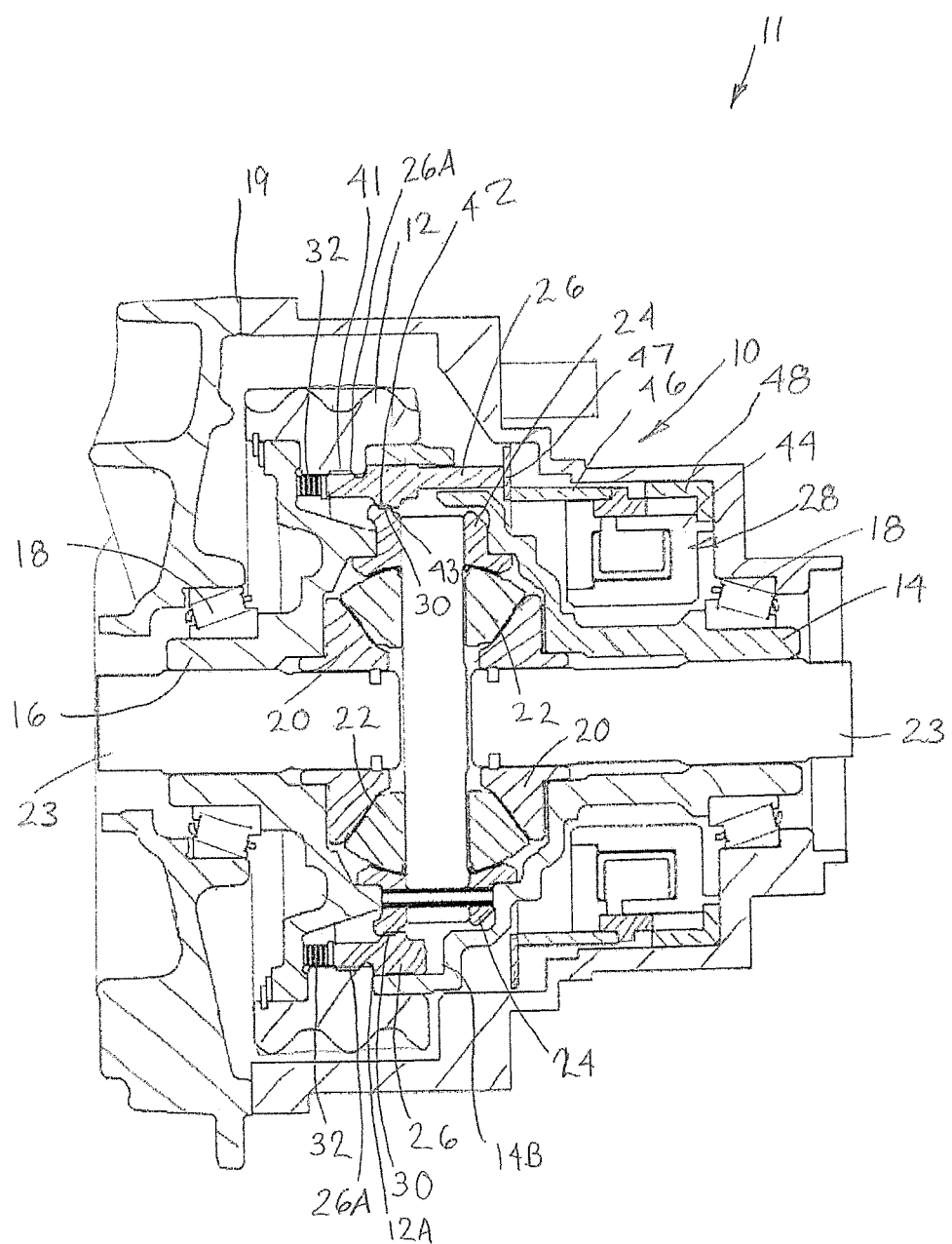
FIG. 2 is a cross-section side view of the differential disconnect assembly according to the first embodiment of the invention in a closed condition.
Figure 3:
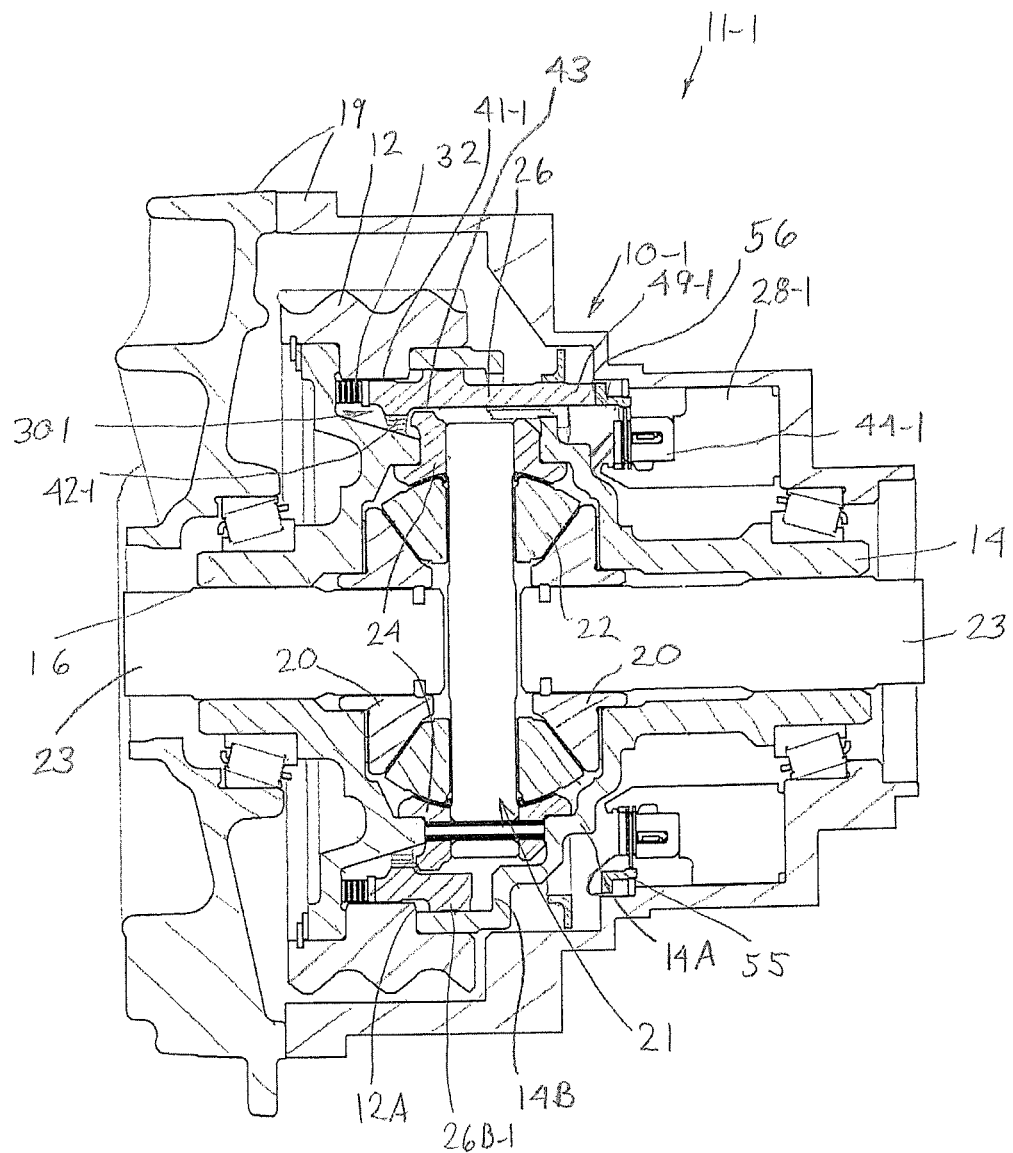
FIG. 3 is a cross-section side view of a differential disconnect assembly according to a second embodiment of the invention in an open condition.
Figure 4:
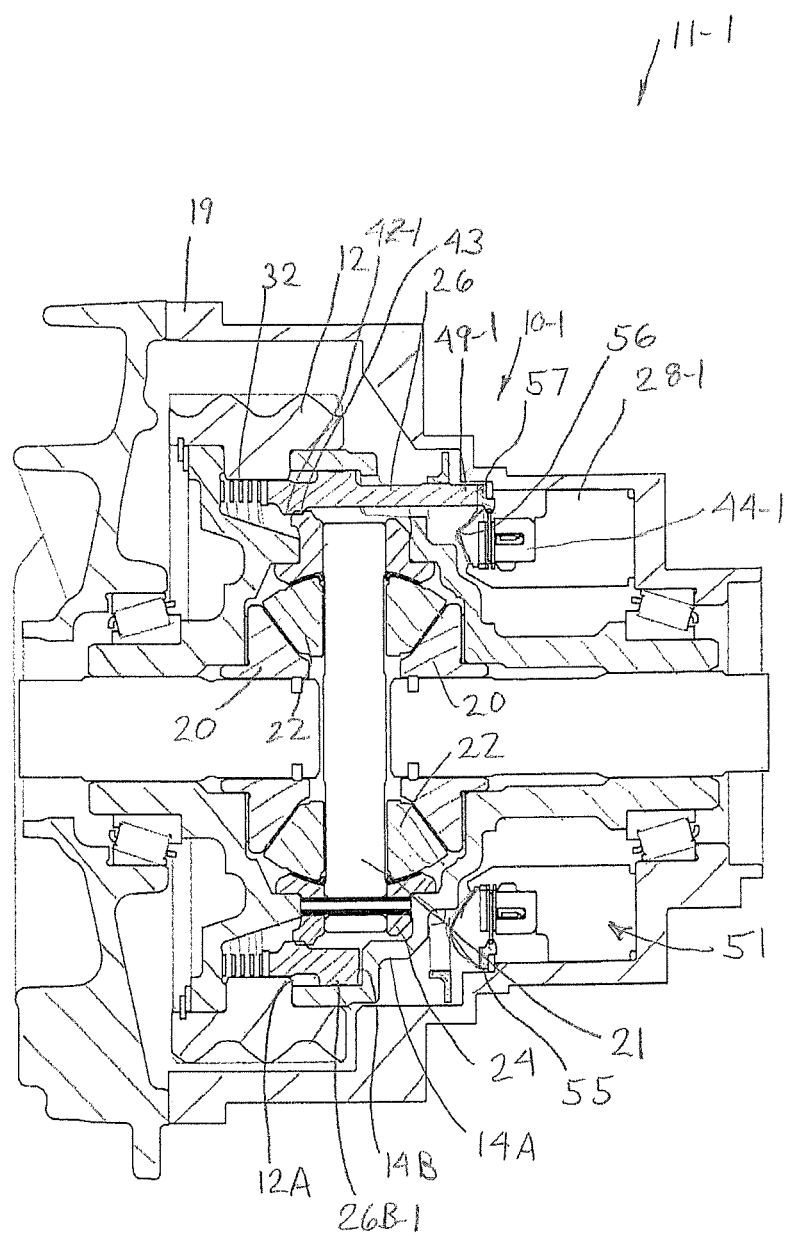
FIG. 4 is a cross-sectional side view of the differential disconnect assembly according to the second embodiment of the invention in a closed condition.

Referring to the Figures, wherein like numerals indicate like or corresponding parts throughout the several views, a differential disconnect assembly according to a preferred first embodiment of the invention is shown at 10 in FIGS. 1 and 2 wherein the disconnect assembly 10 is provided in a vehicle gear box 11 and is normally disconnected or open in this embodiment. The gear box 11 may also be referenced as the vehicle axle as understood from the following description. FIGS. 3 and 4 illustrate an alternative second embodiment of the disconnect assembly 10 including substantially the same components in a modified arrangement as shown in the drawings wherein the disconnect assembly 10 may be held in either the disconnected or open condition of FIG. 3 or the connected or closed condition of FIG. 4. The intent of the invention is to be able to disconnect a ring gear 12 from the differential gears of the vehicle gear box 11, which would allow the ring gear 12, differential housing 14, bearings 18, and rest of the gear box to stop spinning while the wheels of the vehicle are spinning.

Specifically, referring to FIG. 1, a ring gear 12 is supported, both axially and radially, by a differential housing 14 and differential cover 16. The differential housing 14 and differential cover 16 are rotatably supported by a set of bearings 18 which are grounded by the stationary housing 19, which is stationarily supported on a vehicle. In the alternative, it will be understood that this inventive design would also allow the ring gear 12 to be directly supported by bearings on the stationary housing 19 which would allow elimination of either or both of the differential housing 14 or differential cover 16. The ring gear 12 is configured to engage with and be driven by a vehicle drive shaft or drive train, which in turn is driven by a vehicle engine or motor. Differential side gears 20 are supported by stationary housing 19 and preferably by the differential housing 14 and differential cover 16, wherein the side gears 20 are in meshed engagement with a pinion gear assembly 21 and in particular with a set of differential pinion gears 22, and operate to drive torque to any combination of shafts 23, which may be any type of output shafts, half shafts, link shafts, etc. as is known in the art. These shafts 23 thereby rotate with and selectively drive vehicle wheels connected thereto.

The differential pinion gears 22 are mechanically connected to a differential gear nest 24 such that torque can be transferred from the differential gear nest 24 to the differential pinion gears 22 and then to the differential side gears 20. The differential gear nest 24 is supported, both radially and axially, by the differential housing 14 and differential cover 16, and thus can spin freely relative to both. The gear nest 24 could be supported by other components such as the ring gear, main housing, bearings or the like. A spline ring 26 is radially piloted inside the differential housing 14 and has a mechanical connection 26A which locks it rotationally to the ring gear 12. In the alternative, it will be understood that the spline ring 26 might be mechanically connected with the gear nest 24 and slidably engage and disengage from the ring gear 16, particularly if the differential housing and/or cover 14 and 16 are eliminated.

In operation, when an actuator 28 is activated, it will move the spline ring 26 axially and it will in turn engage a clutch 30 between the spline ring 26 and the differential gear nest 24 as seen in FIG. 2, allowing torque to travel from the ring gear 12, through the spline ring 26, and into the differential gear nest 24. A return spring 32 will move the spline ring 26 axially when the actuator 28 is deactivated and will disengage the clutch 30 between the spline ring 26 and differential gear nest 24, thereby allowing the differential gear nest 24 to spin freely relative to the ring gear 12. In this embodiment, the spline ring 26 is normally biased by the return spring 32 to the disconnected or open condition shown in FIG. 1. The actuator 28 in turn is activated or operated to drive the spline ring 26 axially to the connected or closed condition of FIG. 2.

This three piece differential design removes the torsional loading from the differential housing 14, allowing the housing 14 to be smaller and/or made of different materials which can still handle the axial and radial loading requirements on the assembly 10 or allow the housing 14 to be eliminated entirely.

In more detail, the improved gear box 11 is provided on a vehicle and has the rotatable ring gear 12 disposed in the outer housing 19 which is stationary and defines an interior compartment in which the above-described components are housed. The gear box or axle 11 is operatively connected to the drive shaft of the vehicle drive train and engine or motor, wherein the ring gear 12 is rotatably driven by the drivetrain. The outer housing 19 defines a pair of bearing seats 18A, which support the bearings 18. Preferably, the ring gear 12 is rotatably supported, both axially and radially, by the differential housing 14 and a differential cover 16, which each include respective end flanges 36 and 37 that are rotatably supported on the housing 19 by the bearings 18. As such, the ring gear 12, differential housing 14 and differential cover 16 rotate together within the interior housing compartment. As noted above, the ring gear 12 may alternatively be directly supported by bearings on the stationary housing 19 which would allow elimination of either or both of the differential housing 14 or differential cover 16.

The housing end flange 36 and the cover end flange 37 are open to allow the shafts 23 of the side gears 20 to extend axially therefrom for driving of the wheels. Due to the connection of the shafts 23 and side gears 20 to the wheels, the shafts 23 and side gears 20 will rotate when the wheels rotate.

Further, the side gears 20 are selectively driven by rotation of said ring gear 12 by the pinion gears 22 operatively connected therebetween. The pinion gears 22 are rotatably connected together by a pinion shaft 38 in the pinion assembly 21, wherein the pinion shaft 38 rotatably supports the pinon gears 22 on the ends thereof and rotates with the pinion gears 22 as the pinion gears 22 travel about the side gears 20. The pinion assembly 21 further includes the gear nest 24 connected to the pinion shaft 38 by the connector pin 39 so that the pinion gears 22, pinion shaft 38 and gear nest 24 all travel together about the same shaft axis as the side gears 20. The side gears 20 are in meshed engagement with the pinion gears 22 and the ring gear 12 is engageable with the gear nest 24 such that torque can transfer from the ring gear 12 through the gear nest 24, the pinion gears 22 and then the drive gears 20 to thereby drive the shafts 23.

However, as noted above, it is desirable to decouple the ring gear 12 and side gears 20 so that the ring gear 12 need not rotate at all times when the wheels are rotating. As such, the inventive gear box 11 includes the disconnect assembly 10 provided between the ring gear 12 and the pinion gear assembly 21, and preferably between the ring gear 12 and gear nest 24, wherein the disconnect assembly 10 is selectively operated to connect and disconnect the ring gear 12 from the differential pinon gears 22. Disconnection allows the ring gear 12, differential housing 14, bearings 18, and the rest of the gear box to stop spinning while the wheels of the vehicle are spinning.

In more detail, the differential gear nest 24 is supported, both radially and axially, by the differential housing 14 and differential cover 16, and can spin freely relative to both as the gear nest 24 travels with the pinion gears 22 about the side gears 20. The gear nest 24 could be supported by other structures as referenced above. To connect the gear nest 24 and ring gear 12, the disconnect assembly 10 includes the spline ring 26, which is radially piloted and slidable axially on the inside of the differential housing 14. The spline ring 26 has an outer surface, which preferably includes radial connector projections 41 that engage with complementary connector formations on the inside surface of the ring gear 12 to define a mechanical connection which locks the spline ring 26 rotationally to the ring gear 12. The connector projections 41 may be formed as spline teeth or other similar structures which lock relative rotation of the ring gear 12 and spline ring 26 when engaged while permitting axial displacement of the spline ring 26 between the open and closed positions of FIGS. 1 and 2.

Also, the spline ring 26 releasably connects with and disconnects from the gear nest 12 during axial sliding of the spline ring 26 to releasably connect the ring gear 12 to the gear nest 24 and pinion gears 22. In particular, the disconnect assembly 10 comprises a releasable clutch 30 which preferably is defined by a set of clutch teeth or other similar locking formations 42 on the inside diameter or surface of the spline ring 26 and complementary locking formations 43 on the outer diameter or surface of the gear nest 24. In the alternative, it will be understood that the spline ring 26 might be mechanically connected with the gear nest 24 and slidably engage and disengage from the ring gear 16 to connect and disconnect torque transmission, particularly if the differential housing and/or cover 14 and 16 are eliminated.

The spring 32 normally biases the spline ring 26 to the open position of FIG. 1, wherein the locking formations 42 and 43 are separated and disengaged, such that the ring gear 12 is rotatably disconnected from the gear nest 24. However, the spline ring 26 may be driven axially by the actuator 28 to engage the locking formations 42 and 43 of the clutch 30 and as seen in FIG. 2 when the actuator 28 is operated and activated. The ring gear 12 and a housing side wall 14A essentially define opposed surfaces 12A and 14B which spaced apart to permit axial sliding of an outer shoulder 26B of the spline ring 26 during movement of the spline ring 26. When the actuator 28 is activated, the ring gear 12 is now rotatably connected to the gear nest 24 to transfer torque from the ring gear 12, through the spline ring 26, and into the differential gear nest 24. When the actuator 28 is deactivated, the spring 32 returns the spline ring 26 to the open disconnected position of FIG. 1 wherein the clutch 30 is disengaged to thereby allow the differential gear nest 24 to spin freely relative to the ring gear 12. As such, torsional loading is eliminated from the differential housing 14.

To drive the spline ring 26, the actuator 28 includes a drive unit 44 which is stationarily supported on the outer housing 19. The drive unit 44 includes a slide ring or pusher 45 which is axially displaceable between the positions of FIGS. 1 and 2. Preferably, the actuator 28 is an electromagnetic actuator 28 wherein the pusher 45 is driven axially by the drive unit 44 using an electromagnetic force. It will be understood that other types of actuators are suitable such as a motor, worm gear, a cam, a ball ramp, hydraulic or pneumatic piston or other suitable actuators. The pusher 45 in turn may axially drive a collar 46, which in turn drives a radial plate 47. A spacer 48 may be provided to control the radial and axial position of the pusher 45. The spline ring 26 preferably includes one or more drive arms 49 which project axially through complementary windows in the differential housing 14 so that the drive arms 49 may contact the radial plate 47 and be driven by the pusher 45 through the intermediate collar 46. The drive arms 49 preferably do not contact the windows of the differential housing 14 so as to permit axial movement of the spline ring 26.

The drive unit 44 remains stationary while the pusher 45, collar 46 and plate 47 can move axially but preferably do not rotate with the spline ring 26 during rotation of the ring gear 12. The spline ring 26 may rotate and slide along the plate 47. It will be understood that other types of drive units 44 may be used to selectively displace the spline ring 26. When the drive unit 44 is deactivated, the spring 32 biases the spline ring 26, plate 47, collar 46 and pusher 45 back to the position of FIG. 1 to open the spline connection, and when the drive unit 44 is activated, reverse movement of these components occurs to close the spline connection as shown in FIG. 2.

This system is essentially mono-stable since the spline ring 26 normally stays in the first position of FIG. 1 unless and until the actuator 28 is activated to move the spline ring 26 to the second position of FIG. 2. When the actuator 28 is deactivated, the spline ring 26 then returns to the first position (FIG. 1) due to the biasing of the spring 32. Further, the normal position of FIG. 1 preferably is the open disconnect position, and the active position of FIG. 2 is the closed connection position. It will be understood that the configuration of the spline ring 26 and spring 32 can be modified so as to be configured similar to the equivalent components of FIGS. 3 and 4 to operate with the actuator 28 so that a normal position is a closed position and an active position is an open position.

To reduce the space requirements of the actuator 28, the drive unit 44 preferably is positioned in an annular pocket 50 defined axially between a side wall 14A of the differential housing 14 and the bearing 18 and radially outwardly of the housing end flange 36. This allows the drive unit 44 to fit radially inwardly of the pusher 45, collar 46 and spacer 48 to reduce the radial size of the gear box 11 in this region. These components in turn are enclosed by a radial wall section 19A and annular wall section 19B of the outer housing 19 to define an actuator compartment 51.

While the spline ring 26 is disposed radially between the ring gear 12 and gear nest 24, the spline ring may alternatively be disposed axially between a modified ring gear and gear nest to perform the functions described herein. Further, the disconnect assembly could incorporate other structures in place of the spline ring such as a dog clutch or clutch plates which selectively connect and disconnect torque transfer between the ring gear and pinion gears. In these alternate designs, torque transmission through a differential housing does not occur.

In another embodiment as shown in FIGS. 3 and 4, a gear box 11-1 is shown which uses common parts designated by common reference numerals wherein modified parts are designated with the designator "-1". In this modified gear box 11-1, the disconnect assembly 10-1 is bi-stable in that the spline ring 26-1 is moved to either the disconnected or open position of FIG. 3 or the connected or closed position of FIG. 4 when the actuator 28-1 is operated and remains in this position when the actuator 28-1 is inactive. In this bi-stable design, the spring 32 normally biases the spline ring 26-1 toward the actuator 28-1, and when the actuator 28-1 is inactive, the spline ring 26-1 remains in either the connected or closed position of FIG. 4 to connect torque transmission between the ring gear 12 and gear nest 24 or the disconnected open position of FIG. 3 to disconnect torque transmission. The actuator 28-1 may be intermittently operated to axially displace the spline ring 26-1 from to one position to the other wherein the spline ring 26-1 remains in such position until the actuator 28-1 is again activated.

In more detail, the improved gearbox 11-1 operates substantially the same as gearbox 11 wherein the rotatable ring gear 12 is disposed in the outer housing 19 which is stationary. The ring gear 12 is rotatably supported, both axially and radially, by the differential housing 14 and a differential cover 16, wherein the ring gear 12, differential housing 14 and differential cover 16 rotate together within the outer housing's interior compartment. As noted above, the ring gear 12 also may be supported directly on the outer housing 19 by a bearing set.

The side gears 20 are selectively driven by rotation of said ring gear 12 by the pinion gears 22 operatively connected therebetween. The pinion gears 22 are rotatably connected together in the pinion assembly 21, wherein the pinion gears 22 travel about the side gears 20. The pinion assembly 21 further includes the gear nest 24 wherein the side gears 20 are in meshed engagement with the pinion gears 22 and the ring gear 12 is engageable with the gear nest 24 such that torque can transfer through the gear nest 24, the pinion gears 22 and then the drive gears 20 to thereby drive the shafts 23.

The disconnect assembly 10-1 is provided between the ring gear 12 and the pinion gears 22, and preferably between the ring gear 12 and gear nest 24, wherein the disconnect assembly 10-1 is selectively or intermittently operated to connect and disconnect the ring gear 12 from the differential pinon gears 24. The disconnect assembly 10-1 includes a modified spline ring 26-1, which is radially piloted and slidable axially on the inside of the differential housing 14 like spline ring 26. The spline ring 26-1 has an outer surface, which preferably includes radial connector projections 41-1 that engage with complementary connector formations on the inside surface of the ring gear 12 to define a mechanical connection which locks the spline ring 26-1 rotationally to the ring gear 12. The connector projections 41-1 may be formed as spline teeth or other similar structures which lock relative rotation of the ring gear 12 and spline ring 26-1 when engaged while permitting axial displacement of the spline ring 26 between the open and closed positions of FIGS. 3 and 4.

Also, the spline ring 26-1 releasably connects with and disconnects from the gear nest 12 during axial sliding of the spline ring 26-1 to releasably connect the ring gear 12 to the gear nest 24 and pinion gears 22. In particular, the disconnect assembly 10-1 comprises a releasable clutch 30-1 which preferably is defined by a set of clutch teeth or other similar locking formations 42-1 on the inside surface of the ring gear 26-1 and complementary locking formations 43 on the opposing outer surface of the gear nest 24. In the alternative, it will be understood that the spline ring 26 might be mechanically connected with the gear nest 24 and slidably engage and disengage from the ring gear 16, particularly if the differential housing and/or cover 14 and 16 are eliminated.

The spring 32 normally biases the spline ring 26 toward and against the actuator 28-1 as generally seen in the closed position of FIG. 4, wherein the locking formations 42-1 and 43 are engaged, such that the ring gear 12 is rotatably connected to the gear nest 24. However, the actuator 28-1 is provided in the actuator pocket 51, and the spline ring 26-1 may be driven axially by the actuator 28-1 to either disengage or engage the locking formations 42-1 and 43 of the clutch 30-1 as seen in FIGS. 3 and 4 when the actuator 28-1 is operated and activated. When the actuator 28-1 is activated in this manner, the spline ring 26-1 moves to either of the positions of FIGS. 3 and 4 and remains in such position when the actuator 28-1 is deactivated. When in the position of FIG. 3, the ring gear 12 is now rotatably disconnected from the gear nest 24 to stop the transfer torque from the ring gear 12, through the spline ring 26-1 and into the differential gear nest 24, which thereby allows the ring gear 12 to stop spinning. When the actuator 28-1 is activated, the spline ring 26-1 returns to the closed connected position of FIG. 4. Here again in this alternate design, torsional loading is eliminated from the differential housing 14.

Further as to movement of the spline ring 26-1, the ring gear 12 and a housing side wall 14A essentially define opposed surfaces 12A and 14B which are spaced apart to permit sliding of an outer spline shoulder 26B-1 of the spline ring 26-1 therebetween during movement of the spline ring 26-1. To allow the spline ring 26-1 to travel farther to the left as seen in FIG. 3, the axial location of the locking formations 42-1 and axial length of the spline shoulder 26B-1 are modified relative to the locking formations 42 and spline shoulder 26B described above. As noted above, this modified spline configuration may also be used in the design of FIGS. 1 and 2 to provide a normally closed connected condition and provide an open disconnected condition when actuated.

To drive the spline ring 26-1, the actuator 28-1 includes a drive unit 44-1 which is stationarily supported on the outer housing 19. The drive unit 44-1 has a pilot clutch operatively engaged with an annular cam ring 55 formed with an axial-facing contour or cam profile that defines circumferentially spaced peaks 56 and valleys 57. The cam ring 55 may rotate with the spline ring 26-1 relative to the drive unit 44-1 but may be releasably clamped or circumferentially restrained by the drive unit 44-1 during intermittent actuation of the actuator 28-1. The spline ring 26-1 preferably includes one or more drive arms 49-1 which project axially through complementary windows in the differential housing 14 and axially contact the cam ring 55 due to biasing of the spring 32. When the cam ring 55 is clamped or restrained, the drive arm 49-1 slides circumferentially along the contoured cam surface which thereby reciprocates the spline ring 26-1 axially as the drive arm 49-1 follows or rides up and over the peaks 56 and valleys 57. When the drive unit 44-1 is deactivated, the cam ring 55 again can rotate with the spline ring 26-1 and holds the spline ring 26-1 in either the open position of FIG. 3 when the drive arm 49-1 contacts a peak 56 or the closed position of FIG. 4 when the drive arm 49-1 aligns with a valley 57. Therefore, each time the drive unit 44-1 is activated, the cam ring 55 shifts circumferentially to align either a peak 56 or valley 57 with the spline ring 26-1 and the spline ring 26-1 remains in the axial position associated with the peak 56 or valley 57 when the actuator 28-1 is deactivated. One form of this actuator 28-1 is disclosed in published PCT Application WO/2018/156576 A1, the disclosure of which is incorporated herein by reference in its entirety.

In this second embodiment, bi-stable operation of the disconnect assembly 10-1 is provided.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

The invention claimed is:

1. A differential for a vehicle comprising:
   an outer housing;
   a rotatable ring gear rotatably supported by said outer housing;
   a pinion gear assembly comprising a plurality of pinion gears drivingly connectable to said ring gear;
   a plurality of side gears rotatably disposed within said outer housing and meshing with said pinion gears such that said side gears and said pinion gears rotate together;
   a disconnect assembly operatively connected between respective surfaces of said ring gear and said pinion gear assembly such that said ring gear, said pinion gears and said side gears when connected rotate together, said disconnect assembly being actuatable to operatively disconnect said ring gear from said pinion gear assembly to disconnect torque transmission between said ring gear and said pinion gears and prevent driving rotation of said ring gear by said pinion gears during wheel rotation; and
   a differential housing and a differential cover rotatably supported on said outer housing, wherein said ring gear rotates together with at least one of said differential housing and said differential cover, wherein said disconnection of said ring gear from said pinion gear assembly allows said ring gear, said differential housing, and said differential cover to stop spinning while said side gears are spinning.

2. The differential according to claim 1, wherein said differential housing and said differential cover are supported on said outer housing by respective bearings, said bearings also being allowed to stop spinning while said side gears are spinning.

3. The differential according to claim 1, wherein said pinion gear assembly includes a gear nest movable with said pinion gears, wherein said disconnect assembly connects to and disconnects from said gear nest to connect and disconnect said torque transmission.

4. The differential according to claim 3, wherein said disconnect assembly includes a spline member which is movable into and out of engagement with said ring gear and said gear nest to respectively connect and disconnect said torque transmission.

5. The differential according to claim 4, wherein said spline member is slidably engaged with said ring gear and movable between connection and disconnection positions, wherein said spline member engages with said pinion gear assembly when in said connection position and disengages from said pinion gear assembly when in said disconnection position.

6. The differential according to claim 5, wherein said spline member is movable by an actuator.

7. The differential according to claim 1, wherein said disconnect assembly includes a spline member which is movable into and out of engagement with said ring gear and said pinion gear assembly to respectively connect and disconnect said torque transmission.

8. The differential according to claim 7, wherein said spline member nonrotatably engages said ring gear and is movable between connection and disconnection positions, wherein said spline member engages with said pinion gear assembly when in said connection position to connect said torque transmission and disengages from said pinion gear assembly when in said disconnection position to disconnect said torque transmission, said disconnect assembly further including an actuator to move said spline member.

9. The differential according to claim 8, wherein said disconnect assembly includes a biasing member to normally bias said spline member to one of said connection position and said disconnection position wherein said actuator moves said spline member to the other of said connection position and said disconnection position.

10. The differential according to claim 8, wherein said disconnect assembly includes a biasing member to normally bias said spline member to said connection position wherein said actuator moves said spline member to said disconnection position, or to normally bias said spline member to said disconnection position wherein said actuator moves said spline member to said connection position.

11. The differential according to claim 1, wherein said pinion gear assembly includes a gear nest supported radially and axially by said differential housing and said differential cover, wherein said gear nest can spin freely relative to both said differential housing and said differential cover, said disconnect assembly connecting said gear ring to and disconnecting said gear ring from said gear nest when actuated to connect and disconnect said torque transmission.

12. The differential according to claim 11, wherein said disconnect assembly includes a spline member which is movable into and out of engagement with one of said ring gear and said gear nest to connect and disconnect said torque transmission.

13. The differential according to claim 12, wherein said actuator includes a drive unit stationarily supported on said outer housing and a drive member displaceable axially to move said spline member.

14. The differential according to claim 13, wherein said disconnect assembly includes a biasing member to normally bias said spline member to into or out of engagement with said ring gear and said gear nest and said actuator displaces said spline member counter to said biasing member.

* * * * *